United States Patent
Cutts

(10) Patent No.: US 6,196,706 B1
(45) Date of Patent: *Mar. 6, 2001

(54) GLOWING ELECTRIC LIGHT ASSEMBLY

(76) Inventor: Creighton Cutts, 718 Shoal Creek Rd., Canton, GA (US) 30114

( * ) Notice: Subject to any disclaimer, the term of this patent is extended or adjusted under 35 U.S.C. 154(b) by 0 days.

This patent is subject to a terminal disclaimer.

(21) Appl. No.: 09/113,839

(22) Filed: Jul. 10, 1998

Related U.S. Application Data

(63) Continuation-in-part of application No. 08/989,476, filed on Dec. 12, 1997, now Pat. No. 5,980,061, which is a continuation of application No. 08/589,785, filed on Jan. 22, 1996, now Pat. No. 5,697,694, which is a continuation of application No. 08/181,346, filed on Jan. 14, 1994, now Pat. No. 5,492,664.

(51) Int. Cl.$^7$ .................................................. F21V 21/008
(52) U.S. Cl. .......................... 362/392; 362/391; 362/181; 362/806; 362/253; 362/404
(58) Field of Search ..................................... 362/161, 182, 362/163, 159, 806, 162, 431, 404, 147, 253, 391, 392; 431/289, 288, 291, 126; 264/156, 154, 238, 255, 279.1, 301, 303, 305, 314

(56) References Cited

U.S. PATENT DOCUMENTS

| | | |
|---|---|---|
| 976,359 | 11/1910 | Hamel . |
| 1,292,195 | 1/1919 | Will . |
| 1,709,889 | 4/1929 | Tasker . |
| 1,831,902 | 11/1931 | Brown . |
| 2,328,769 | 9/1943 | Auzin . |
| 2,584,563 | 2/1952 | Duncan . |

(List continued on next page.)

FOREIGN PATENT DOCUMENTS 851609    10/1960   (GB) .

OTHER PUBLICATIONS

The Candle Makers Monthly Periodical, printed by: Pourette Mfg. Co., Title: The Candle Cauldron, No. 61, Oct. 1971.
The Complete Candlemaker, Author: Ann Hirst–Smith, 1974, p. 81, 86–87.
Do it Yourself Home Decorating Ideas, Title: Balloon Shell Candles, 1970, p. 34.
The Candlemakers Candle Book, Author: Rose Stein, pp. 26–29.

* cited by examiner

Primary Examiner—Thomas M. Sember
(74) Attorney, Agent, or Firm—Thomas, Kayden, Horstemeyer & Risley LLP

(57) ABSTRACT

A glowing light assembly includes a base and a spherical wall which includes at least one embedded foreign object and defines an inner cavity containing an electric light member which causes the molded shell to glow and cast shadows without melting. The shell is constructed according to a unique molding method which includes at least partially immersing a swollen distensible mold into a reservoir of molding material to allow the molding material to form a molded layer around the distensible mold. After the distensible mold with the attached molded layer is removed from the reservoir of molding material, it is placed upon a flat surface to form a flat bottom into the shell. A foreign object is then mounted to the inner layer, and the distensible mold with the attached layer is again immersed in the reservoir of molding material to form a second, outer, layer of molded material and embed the foreign object into the shell. Subsequently, the distensible mold is removed from within the shell leaving an inner cavity in which the electric light member is mounted.

7 Claims, 4 Drawing Sheets

U.S. PATENT DOCUMENTS

| | | |
|---|---|---|
| 2,735,285 | 2/1956 | Ferleger . |
| 3,607,998 | 9/1971 | Goodridge . |
| 3,890,085 | 6/1975 | Andeweg . |
| 3,974,996 | 8/1976 | Violet . |
| 3,983,677 | 10/1976 | Lundbom . |
| 4,022,862 | 5/1977 | McBride et al. .................... 264/271 |
| 4,184,195 | 1/1980 | Duncan ................................ 362/163 |
| 4,894,008 | 1/1990 | Lee ........................................ 431/290 |
| 5,078,945 | 1/1992 | Byron ................................... 264/278 |
| 5,178,451 | 1/1993 | Henry ................................... 362/161 |
| 5,213,732 | 5/1993 | Jevtic ...................................... 264/71 |
| 5,262,929 * | 11/1993 | Lenhart ............................... 362/161 |
| 5,492,664 | 2/1996 | Cutts .................................... 264/156 |
| 5,697,694 | 12/1997 | Cutts .................................... 362/161 |
| 5,803,587 * | 9/1998 | Chen .................................... 362/161 |

GLOWING ELECTRIC LIGHT ASSEMBLY

CROSS-REFERENCE TO RELATED APPLICATIONS

This application is a continuation-in-part of application Ser. No. 08/989,476, filed Dec. 12, 1997 now U.S. Pat. No. 5,980,061, which is a continuation of application Ser. No. 08/589,785, filed Jan. 22, 1996 now U.S. Pat. No. 5,697,694, which is a continuation of application Ser. No. 08/181,346, filed Jan. 14, 1994, now U.S. Pat. No. 5,492,664. These applications are incorporated into the current application by reference.

BACKGROUND OF THE INVENTION

The present invention relates generally to the field of molds, and more specifically, to the field of molded lighting assemblies.

The practice of making molded lighting structures such as candles, is very old. Candles are now available in a variety of different sizes and shapes ranging from long, slender candlesticks for use in candelabra to short votive candles for use in religious ceremonies, etc, with all sizes and shapes of candles typically being formed of wax. Additionally, the wax is often scented in order for the candle to emit a pleasant aroma while being burned. It has also been well known to use a variety of devices to accentuate candles. Accordingly, one known practice is to place small candles behind translucent structures such as a decorative stained glass display in order to form a radiance of colored light.

Other lighting structures include candles placed within various types of casings, such as luminaria or other structures, to provide a radiance of colored or contrasted light in several directions. For example, U.S. Pat. No. 2,735,285 discloses a lantern-shaped structure which includes a long candle protruding through a closed roof of a casing which is constructed of wax having a higher melting point than the enclosed candle. As the candle burns down to the lantern-shaped casing, a hole is melted into the roof where it contacts the flame to enable the candle to continue burning within the casing to illuminate the casing. Unfortunately, that hole will likely appear irregular and look as though something has broken off so that the casing is not truly reusable in the sense that it will look much different after the first use. Additionally, as with the use of virtually any candle, a certain amount of smoke will be emitted from the candle while it illuminates the casing, as well as when the candle is extinguished, which has the potential unwanted effect of discouraging use of the candle by anyone possessing a sensitivity to smoke.

There is, therefore, a need in the industry for an apparatus which addresses these and other related, and unrelated problems.

SUMMARY OF THE INVENTION

Briefly described, the present invention includes, in a first preferred embodiment, a glowing lighting assembly including a molded shell formed of wax which includes a flat bottom wall functioning as a base and a substantially spherical side wall extending upward from the bottom wall to define an inner cavity. The glowing light assembly also includes an electric light member mounted through the spherical side wall below an upper light emitting aperture which is formed by the spherical side wall. A foreign object is embedded within the side wall to cast shadows outside the glowing shell when the electric light member is illuminated.

In the first preferred embodiment of the present invention, the molded shell includes an outer shell layer and an inner shell layer, wherein a foreign object is interposed between the layers. The molded shell is particularly shaped and sized relative to the electric light member so that when the electric light illuminates, the molded shell glows without melting while being sufficiently warmed by the electric light to emit a pleasant aroma.

While the light assembly of the first preferred embodiment is designed to rest with its flat bottom wall supported on a flat surface, other preferred embodiments include a display structure, such as a stand for supporting the glowing shell, or a length of chain for hanging the shell, etc., so that the shell can be supported by the display structure or a ceiling. Some other preferred embodiments are configured with light emitting apertures facing downwards, thus permitting the light emitted from the light emitting aperture to illuminate an area below the shell, such as would be suitable for a reading lamp or other similar task lighting uses. In other embodiments, the display structure is configured with light emitting apertures facing upward, and in other embodiments, adjustment mechanisms are included so that the light emanating from the light emitting aperture can be directed at the discretion of the operator.

Furthermore, various embodiments of the present invention include devices for adjusting the intensity of the light emitted from the electric light member to allow the operator to set the desired illuminating effect, while also allowing the temperature of the wax shells to be set, thereby allowing the aromatic intensity emitted from the wax of the shell to be adjusted.

Other features and advantages of the present invention will become apparent upon reading and understanding the present specification, when taken in conjunction with the accompanying drawings.

DETAILED DESCRIPTION OF THE PREFERRED EMBODIMENTS

Figure 1:
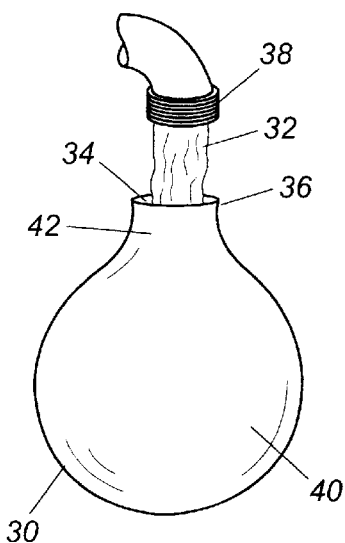
FIG. 1 is a side view representation of a first step of a method of constructing a molded shell which includes expanding a distensible mold by introducing distensing fluid into the mold.

Referring now in greater detail to the drawings in which like numerals represent like components throughout the several views, FIG. 1 shows a side view representation of a first step of a method of constructing a glowing light assembly of the present invention which includes expanding a distensible mold 30 by introducing distensing fluid 32 into an expandable cavity 34 defined within the distensible mold 30. According to one acceptable example, the distensible mold 30 is an ordinary round balloon, and the distensing fluid 32 is a liquid such as water. The distensible mold 30 is shown including a mold lip 36 which can be positioned around a faucet lip 38 during filling of the distensible mold 30. A mold exterior surface 40 is also shown located below a mold neck 42.

Figure 2:
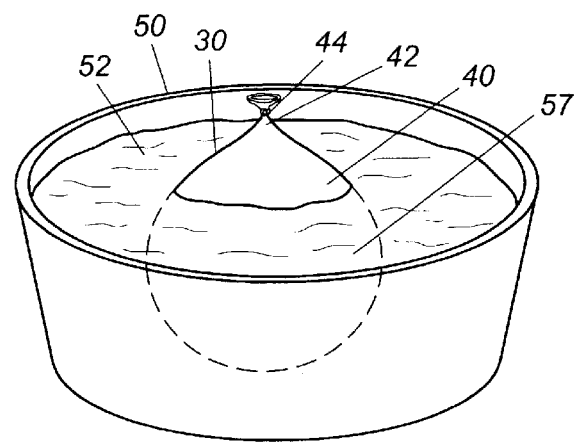
FIG. 2 is a side view representation of a subsequent step of constructing a molded shell which includes partially submerging the swollen distensible mold into a reservoir of molding material.
Figure 3:
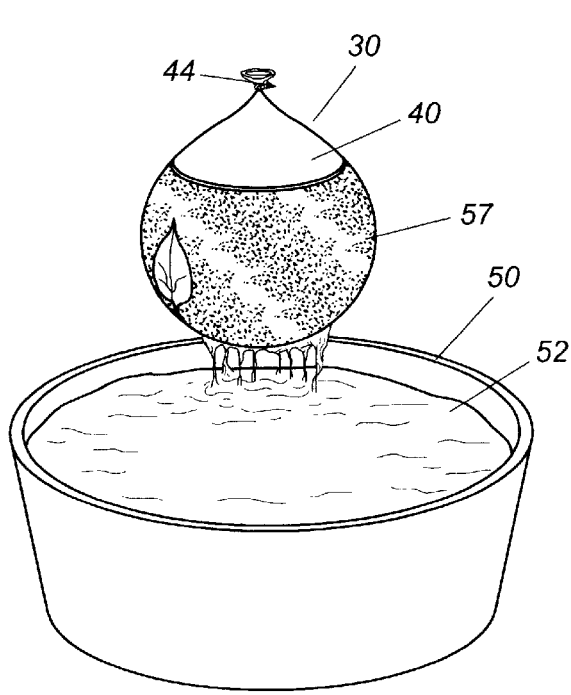
FIG. 3 is a side view representation of another subsequent step of constructing a molded shell which includes removing the distensible mold with a layer of molding material formed around the distensible mold.
Figure 4:
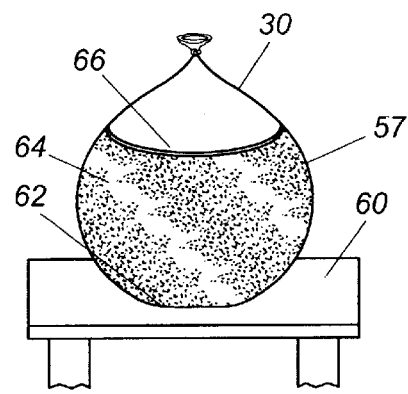
FIG. 4 is a side view representation of another subsequent step of constructing a molded shell which includes placing the mold with attached layer of molding material upon a flat surface to solidify.

Referring now to FIG. 2, after the distensible mold 30 has been expanded, the mold neck 42 is tied into a neck knot 44 which seals the distensible mold 30 and provides a place to easily grasp the distensible mold 30. The expanded distensible mold 30 is then partially submerged into a reservoir 50 of molding material 52. According to the first preferred embodiment, the molding material 52 is molten beeswax having a temperature of approximately 155° F. The distensible mold 30 is allowed to remain within the reservoir 50 until the molding material 52 forms a shell layer 57 around the mold exterior surface 40. With reference to FIG. 3, as the distensible mold 30 is removed from the reservoir 50, the shell layer 57 is shown attached around the mold exterior surface 40. The distensible mold 30 with attached shell layer 57 is then placed, as shown in FIG. 4, upon a flat surface 60 and allowed to solidify. Because of the weight of the distensing liquid 32 (FIG. 1) within the distensible mold 30, a flat bottom wall 62 is formed. A continuous side wall 64 extends substantially spherically upward from the bottom wall 62 until terminating at a top edge 66.

Figure 5:
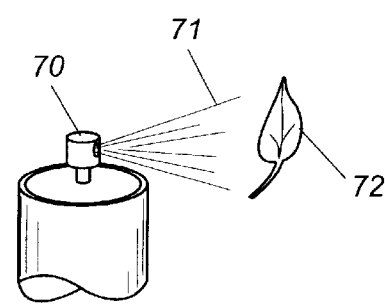
FIG. 5 is a side view representation of another subsequent step of constructing a molded shell which includes spraying adhesive onto a foreign object for attachment to the layer of molding material.
Figure 6:
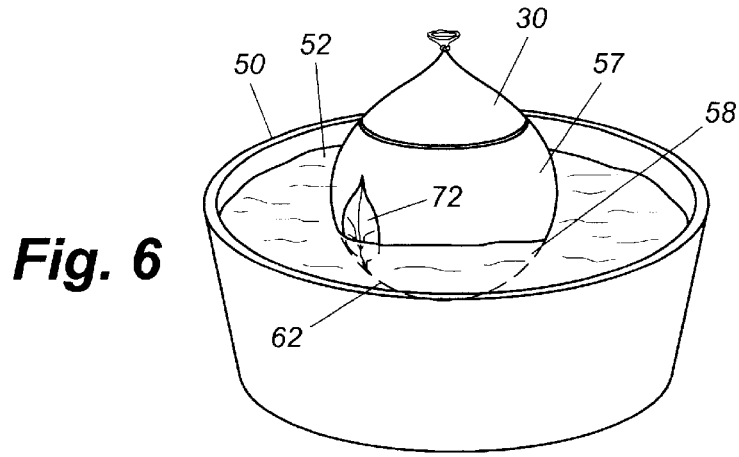
FIG. 6 is a side view representation of another subsequent step of constructing a molded shell which includes submerging the mold with attached layer of molding material, which becomes the inner layer, and foreign object into a reservoir of molding material.
Figure 7:
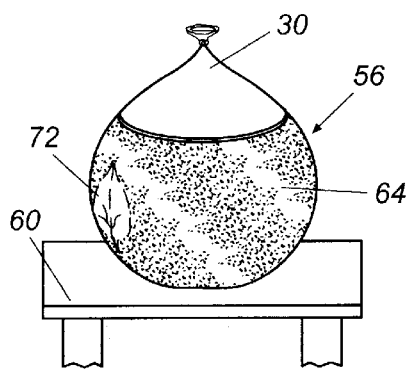
FIG. 7 is a side view representation of another subsequent step of constructing a molded shell which includes placing the mold with attached shell, composed of an inner layer and outer layer, and embedded foreign object onto a flat surface.

In a subsequent step, a foreign object, such as a flower, a leaf, or any other object, 72 as shown in FIG. 5, receives an adhesive 71 from an adhesive container 70. One example of an acceptable adhesive is the 3M Super 77™ spray adhesive available from 3M of St. Paul, Minn. Another acceptable example includes a diluted mixture of ordinary honey and water. The foreign object 72 is then mounted onto the side wall 64 before the distensible mold 30 with attached shell layer 57 is partially submerged within the reservoir 50 to embed the foreign object 72 between the shell inner layer 57 and the shell outer layer 58 by adding another layer of molding material 52 to the first shell layer 57, (FIG. 6), which becomes the inner shell layer. Subsequently, the distensible mold 30 with attached shell 56, composed of an inner shell layer 57 and an outer shell layer 58, is again removed from the reservoir 50 and allowed to solidify upon the flat surface 60 as shown in FIG. 7.

Figure 8:
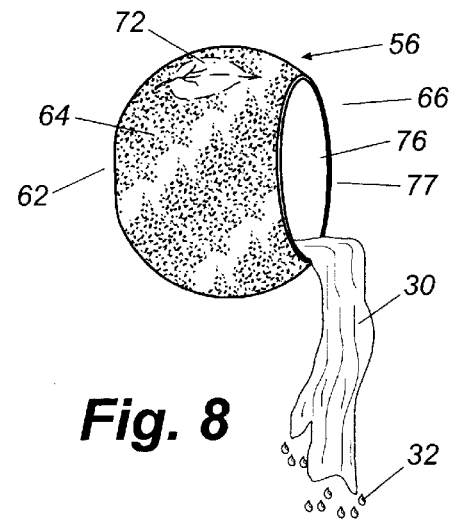
FIG. 8 is a side view representation of another subsequent step of constructing a molded shell which includes removing the distensing fluid and distensible mold from the shell.

Referring now to FIG. 8, after the shell 56 has dried and solidified, the distensible mold 30 is opened, such as by popping, so that both the distensible mold 30 and the distensing fluid 32 can be easily poured from the shell 56. As a result, an inner cavity 76 is left within the shell 56, while top edge 66 defines a light emitting aperture 77 which provides access into the inner cavity 76.

Figure 9:
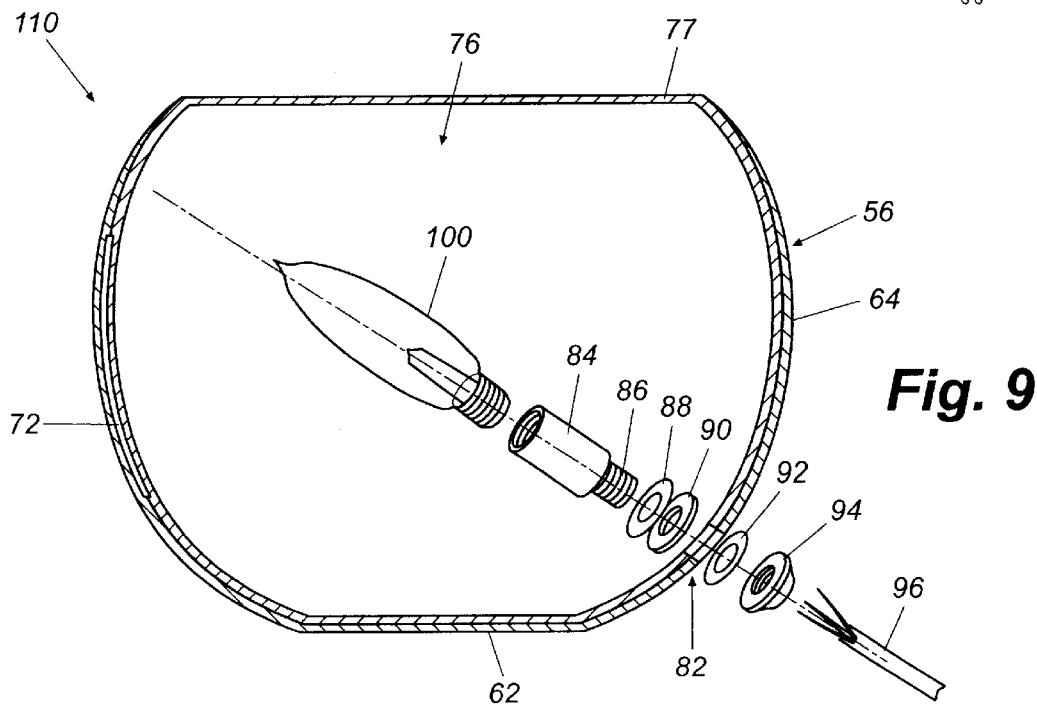
FIG. 9 is a side cross-sectional and partially exploded view of a glowing light assembly constructed in accordance with the first preferred embodiment of the present invention.
Figure 10:
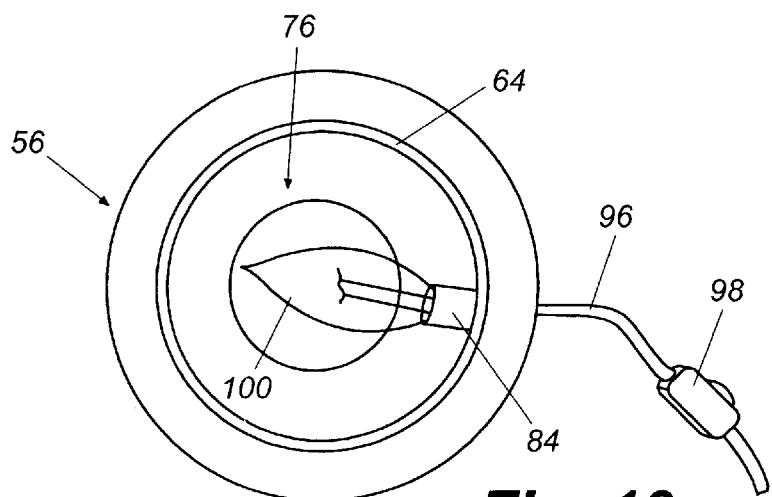
FIG. 10 is a top view of the glowing light assembly of FIG. 9.

With reference now to FIGS. 9 and 10, a heated tool 80 (not shown) is inserted into the side wall 64 to open a mounting aperture 82 into the inner cavity 76. A light bulb receptacle 84 having a threaded base portion 86 is mounted substantially within the inner cavity 76 by placing a threaded base portion 86 through the aperture 82 such that the base portion 86 captures a semi-rigid washer 88 and a compression washer 90 within the cavity 76, while capturing an additional semi-rigid washer 92 and a locking nut 94 outside the side wall 64. The combination of washers 88, 90, 92 and locking nut 94 retain the receptacle 84 in a substantially fixed relationship to the side wall 64 when a locking nut 94 is securely screwed into place about the threaded base portion 86 by compressing the compression washer 90, made of rubber or other suitable material, against the interior of the side wall 64, thereby allowing the compression washer 90 to take on the curvature of the side wall 64 and provide a stable mount for the receptacle 84. Wiring 96, which includes an on-off switch 98 and common plug (not shown), and a bulb 100 are connected to the receptacle 84 in a known conventional manner.

The glowing light assembly 110 operates when the bulb 100 is illuminated, thereby causing light to be emitted all around the inside of the side wall 64 to cause the molded shell 56 to glow most dramatically. Thus, the glowing light assembly 110 is itself transformed into a visually appealing glowing object which casts shadows formed by the embedded foreign object 72, such as a leaf. In addition, light from the bulb 100 shines directly through the light emitting aperture 77 to produce a projection of light.

Furthermore, despite the heat generated by the bulb 100 and the fact that the shell 56 is constructed of the meltable molding material 52 (FIG. 2), the shell 56 glows without melting. This phenomenon can be attributed to, among other factors, the type of molding material 52 (FIG. 2) forming the shell 56, the location of the bulb 100 within the shell 56 and the wattage of the bulb, which should be a maximum of fifteen (15) watts. In addition, the substantially spherical shape of the shell 56 is felt to be important in dispersing the heat from the bulb 100 and dispersing a pleasant beeswax aroma while helping to prevent the shell 56 from melting.

Figure 11:
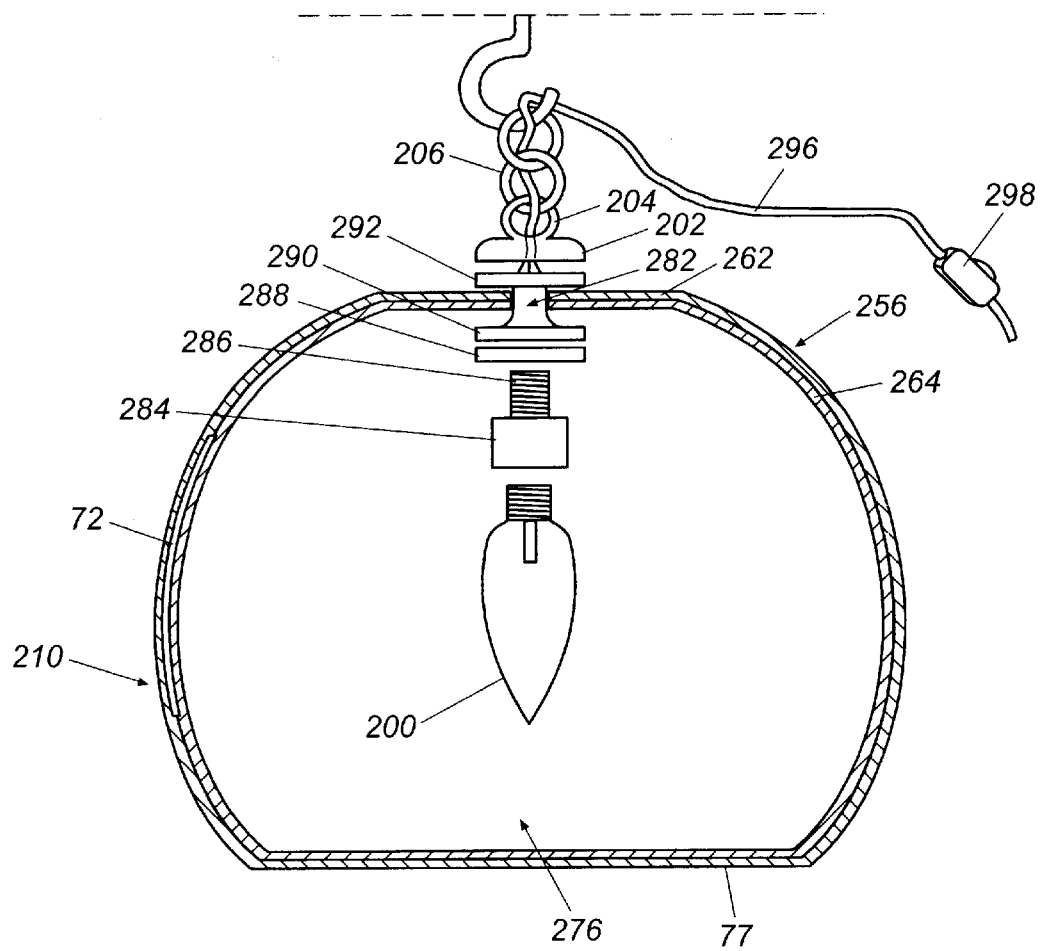
FIG. 11 is a side cross-sectional and partially exploded view of a glowing light assembly in accordance with another preferred embodiment of the present invention which includes a display support in the form of a length of chain.

The present invention also includes many other preferred embodiments, one of which is illustrated in FIG. 11, which shows a side, cross-sectional, and partially exploded view of a glowing light assembly 210. While the shell 256 of the glowing light assembly 210 is constructed similar to the shell 56 of the first preferred embodiment (FIG. 9), the mounting aperture 282 is formed in the bottom wall 262, as opposed to the side wall 264. A light bulb receptacle 284 having a threaded base portion 286 is mounted substantially within an inner cavity 276 by placing base portion 286 through the aperture 282 such that the base portion 286 captures a semi-rigid washer 288 and a compression washer 290 within the cavity 276, while capturing an additional semi-rigid washer 292 and a retaining nut 202 outside the bottom wall 262. An internally threaded, retaining nut 202 functions similar to locking nut 94 of the first preferred embodiment (FIG. 9) while providing an attachment member 204 for fastening to a flexible suspension member 206, which takes the form of a length of chain for hanging the glowing light assembly 210 such as from a hook placed in a ceiling, so that the glowing light assembly 210 can be used as a decorative hanging lamp. Wiring 96, which includes an on-off switch 298 and common plug (not shown), and a bulb 200 are also connected to the receptacle 284 to facilitate operation of the glowing light assembly 210.

Figure 12:
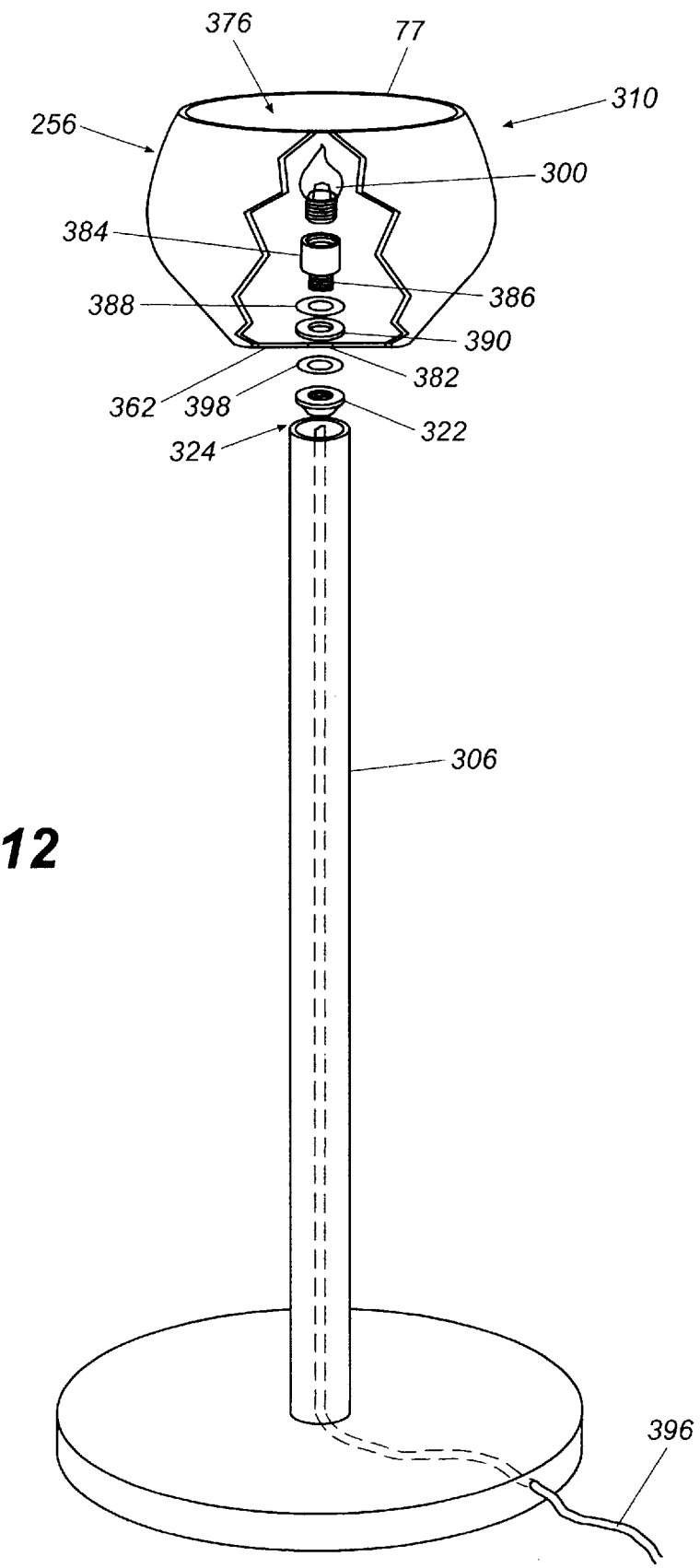
FIG. 12 is a side, partially exploded, cutaway view of a glowing light assembly in accordance with another preferred embodiment of the present invention which includes a display support in the form of a stand.

Another preferred embodiment of the present invention is represented by FIG. 12 which shows a side, partially exploded, cut-away view of glowing light assembly 310. The shell 256 of glowing light assembly 310 is constructed exactly like that of the previous preferred embodiment with the mounting aperture 382 formed in the bottom wall 362. A light bulb receptacle 384 having a threaded base portion 386 is mounted substantially within the inner cavity 376 by placing base portion 386 through the aperture 382 such that the base portion 386 captures a semi-rigid washer 388 and a compression washer 390 within the cavity, 376, while capturing an additional semi-rigid washer 392 and a retaining nut 322 outside the bottom wall 362. An internally and externally threaded retaining nut 322 functions similar to locking nut 94 (FIG. 9) of the first preferred embodiment while providing an attachment member 324 which fastens to a display member 306 which takes the form of a stand or pedestal so that the glowing light assembly 310 can be used as a floor lamp. Wiring,396, which includes an on-off switch 98 (FIG. 10) and common plug (not shown), and a bulb 300 are also connected to the receptacle 384 to facilitate operation of the glowing lighting assembly 310.

While a variety of preferred embodiments of the present invention have already been discussed with reference to the drawings, the present invention includes other preferred embodiments described below which would be readily understood by one reasonably skilled in the art upon review of the foregoing drawings and description. It should be understood that each of the embodiments disclosed herein, including the first preferred embodiment, includes features and characteristics which are considered independently inventive. Accordingly, the disclosure of variations and alterations is intended only to reflect on the breadth of the scope of the present invention without suggesting that any of the specific features and characteristics of the preferred embodiment are more obvious or less important.

The present invention contemplates the use of a variety of differently shaped and differently constructed distensible molds to produce a variety of differently-shaped shells such as those in the shape of types of fruit, animals, cartoon characters, etc. Also, the temperature of the molding material 52 can be varied, as well as mixed with various particulates, to vary the texture and appearance of the shell. To achieve a smooth finish, the temperature of the molten material 52 should be maintained at least above a level where no coating has formed on the top of the molten material 52. In the example of beeswax, as the temperature reaches 140° F., a coating begins to form on top of the beeswax in the reservoir 50 which results in a grainy appearance, whereas temperatures approaching 220° F. cause any trash or water found at the bottom of the reservoir 50 to circulate within the beeswax to change the appearance of the shell 56. The temperature can also be varied to alter the thickness of the layers of the shell 56 with hotter temperatures producing thinner layers. While the heat sink caused by the presence of the distending fluid 32 within the distensible mold 30 reduces the tendency of the shell 56 to lose previously applied layers when exposed to hot molten material 52, the temperature should, to add layers, be kept below the level where previous layers begin to be lost unless one is desiring to begin exposing a previously embedded object.

Regarding the submerging step shown in FIG. 3, rather than pulling the distensible mold 30 out of the molding material 52 in one continuous motion, the distensible mold 30 can be withdrawn in stages to form parallel lateral lines encircling the shell 56 to give the shell 56 the appearance of having been spun on a pottery wheel. In addition, rather than maintain the distensible mold 30 in a vertical position within the molding material 52, the distensible mold 30 can be tilted in various directions to create a more flared shell top edge 66 (FIG. 4). The submerging step may also be repeated multiple times at different heights using variously colored molding materials 52 to produce multi-colored shells.

Also, the shell can be composed entirely of a single layer and one preferred embodiment contains a foreign object on the shell while another preferred embodiment has no foreign objects on the shell. In addition, the side walls of the shell can be treated to create additional apertures in the side walls. The apertures are created by inserting a heated tool into the side wall, opening the aperture into the inner cavity. During that process the shell melts partially so that a dropping streams down the outside of the shell wall. The piercing step can be performed with the shell place at various angles to form a pleasant dropping pattern on the exterior of the shell walls.

In other embodiments, the display member 306 (FIG. 12) is constructed in a variety of different conventional shapes such as a tripod style base, a shephard's hook style top and other adjustable conventions to provide for varying directions of light projections. The height of the display member may also be altered to achieve a floor lamp or a table lamp.

While the embodiments of the present invention which have been disclosed herein are the preferred forms, other embodiments of the present invention will suggest themselves to persons skilled in the art in view of this disclosure. Therefore, it will be understood that variations and modifications can be effected within the spirit and scope of the invention and that the scope of the present invention should only be limited by the claims below.

What is claimed is:

1. A light assembly comprising:
    a meltable beeswax molded shell including a bottom wall and defining an orb with an inner cavity and a light emitting aperture providing access to said inner cavity;
    a foreign object embedded in said molded shell;
    an electric wire attached to an electric light and extending from said molded shell, said electric light element, contacting said bottom wall and located at least partially within said inner cavity for illuminating said molded shell, wherein said electric light element is so located within said inner cavity that said molded shell glows and remains intact without melting during operation of said electric light element; and
    a flexible suspension member attached to said bottom wall, wherein said light emitting aperture is oriented substantially below said bottom wall when said molded shell is suspended from said flexible suspension member.

2. The assembly of claim 1, wherein said molded shell has a substantially uniform thickness.

3. The assembly of claim 1, wherein said electric light element is located entirely within said inner cavity.

4. The assembly of claim 1, wherein said display member is a length of chain.

5. The assembly of claim 1, wherein said foreign object is a portion of a plant.

6. A light assembly comprising:
- a molded meltable wax outer shell layer having a substantially uniform thickness, said outer shell layer defining an outer shell layer inner cavity, an outer shell layer light emitting aperture providing access to said outer shell layer inner cavity, an outer shell layer inner surface, and an outer shell layer outer surface;
- a molded meltable wax inner shell layer having a substantially uniform thickness located at least substantially within said outer shell layer inner cavity, said inner shell layer defining an inner shell layer inner cavity, an inner shell layer aperture providing access to said inner shell layer inner cavity, an inner shell layer inner surface, and an inner shell layer outer surface, said inner shell layer outer surface contacting substantially all of said outer shell layer inner surface;
- a portion of a plant interposed between said inner shell layer outer surface and said outer shell layer inner surface; and
- an electric light element located at least partially within said inner shell layer inner cavity, and wherein said electric light element is so located within said inner shell layer inner cavity such that said inner shell layer and said outer shell layer glow and remain intact without melting during operation of said electric light element.

7. The assembly of claim 6, further comprising a display member attached to said electric light element for supporting said outer and inner shell layers.

* * * * *